United States Patent [19]

Wersosky et al.

[11] 4,338,100

[45] Jul. 6, 1982

[54] DEAERATOR ASSEMBLY

[75] Inventors: John M. Wersosky, Dover; Frederick I. Wakefield, Durham, both of N.H.

[73] Assignee: Ex-Cell-O Corporation, Troy, Mich.

[21] Appl. No.: 201,448

[22] Filed: Oct. 28, 1980

[51] Int. Cl.³ .................................................. C02B 1/10
[52] U.S. Cl. .......................................... 55/18; 55/38; 55/52; 55/164; 55/193; 55/199; 55/206; 55/446
[58] Field of Search ................. 55/164, 176, 193, 199, 55/206, 219, 442, 445, 446, 183, 186, 187, 188, 18, 38, 52; 210/521, 522

[56] References Cited

U.S. PATENT DOCUMENTS

| | | | |
|---|---|---|---|
| 590,535 | 9/1987 | Arbuckle | 210/521 |
| 1,513,354 | 10/1924 | Wansworth | 55/188 |
| 1,602,014 | 10/1926 | Graham et al. | 210/522 X |
| 1,756,288 | 4/1930 | Gray et al. | 55/206 |
| 1,864,095 | 6/1932 | Norman et al. | 55/186 |
| 2,340,132 | 1/1944 | McHugh et al. | 210/522 X |
| 2,622,694 | 12/1952 | Pryor | 55/206 X |
| 2,651,415 | 9/1953 | Worthen et al. | 210/522 X |
| 2,773,555 | 12/1956 | Pare | 55/193 |
| 3,368,330 | 2/1968 | Elliott et al. | 55/206 X |
| 3,920,424 | 11/1975 | Ester et al. | 55/193 |

Primary Examiner—John Adee
Attorney, Agent, or Firm—McGlynn and Milton

[57] ABSTRACT

A liquid-gas deaeration assembly having a plurality of downward slopping cone shaped dispersion members stacked on top of each other and in spaced relationship to each other. Each dispersion member has a circumferential edge extending beyond the edge of the next lower member. The dispersion members have damming means disposed above the upper surface and spaced from the edge to spread the liquid over the surface.

22 Claims, 2 Drawing Figures

DEAERATOR ASSEMBLY

BACKGROUND OF THE INVENTION (1) Field of the Invention

The invention relates to deaerators for removing contaminating fluid from a stream of viscous liquid.

(2) Description of the Prior Art

During various manufacturing processes using viscous liquids, such as plastisols used in slush molding, bubbles of contaminating fluid, such as a gas, are trapped within the viscous liquid and must be removed.

Prior art processes have been designed to either stretch the flow of the liquid into a thin film or to break up the liquid flow into droplets, both processes increasing the surface area of the liquid flow. These processes have been found to have an undesirably limited capacity and spreading ability.

The instant invention has a significantly increased capacity and spreading ability by directing the flow of liquid proportionately to a plurality of cones or dispersion members and significantly increasing the edge surface of each cone resulting in a significantly thinner film of liquid causing the expanded fluid bubbles within the liquid to break and be exhausted by such means as a vacuum pump.

SUMMARY OF THE INVENTION

The instant invention provides a deaerator assembly comprising a plurality of downwardly sloping cone-shaped dispersion members stacked on top of each other and in spaced relationship to each other. Each of the dispersion members has a circumferential edge extending beyond the edge of the next lower dispersion member. The assembly is characterized by the dispersion members including openings therein for distributing a flow of liquid between each of the dispersion members so that the liquid flow is divided into respective flows over the respective dispersion members and over the respective edges. Thusly, the liquid flow is spread into a thin film allowing entrapped fluid within the liquid to escape from the liquid film.

A method of deaerating a flow of liquid is also provided and includes the steps of spreading the liquid over the plurality of downwardly sloping dispersion members and dividing the flow of liquid through the openings extending therethrough into respective flows over the respective dispersion members and over the respective edges thereof. Thusly, the liquid flow is spread into a thin film and the entrapped fluids within the liquid are allowed to escape therefrom.

PRIOR ART STATEMENT

An example of a prior art deaerator is the U.S. Pat. No. 2,773,555 to Pape issued Dec. 11, 1956. The Pape patent teaches a deaerator including an upper cone-shaped screen disposed above a solid cone member. Liquid is fed through the screen which breaks the liquid flow into relatively small droplets. The droplets fall onto the cone member and are collected therebelow. A problem exists with this type of deaerator assembly in that particulate matter commonly associated with viscous liquid, such as plastisols, become trapped in the openings of the screen. Furthermore, the openings in the screen do not divide the liquid flow into separate flows to separate cones.

Another example of a prior art deaerator assembly is taught by the U.S. Pat. No. 3,920,424 to Estep et al issued Nov. 18, 1975. The Estep patent teaches a deaerator including downwardly sloping baffle plates through which the liquid is allowed to flow thereby agitating the liquid. The liquid remains quite thick as it flows through the baffle and is therefore not effectively deaerated.

The instant invention provides a deaerator having a much greater capacity than the prior art deaerators while being significantly more effective.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
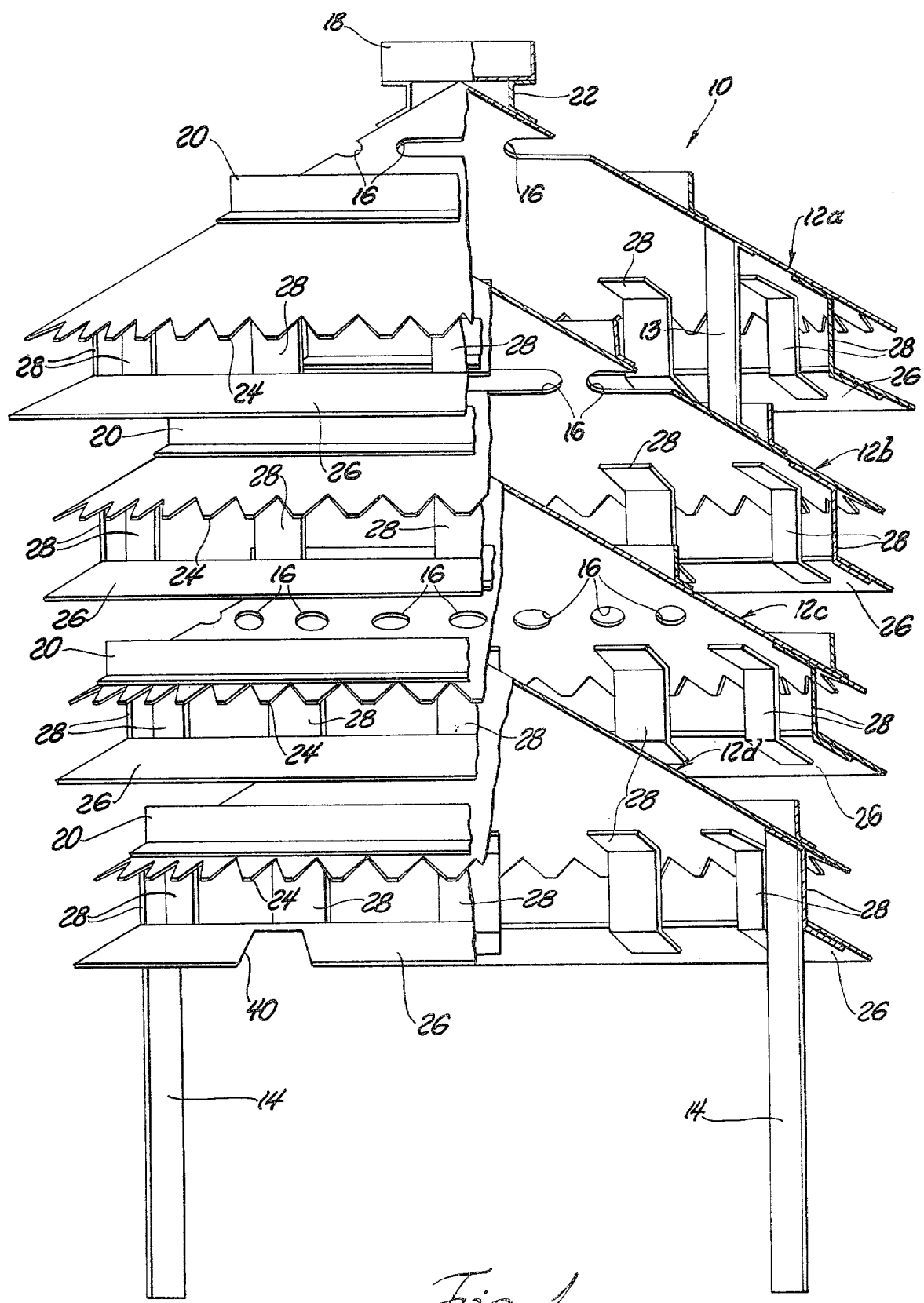
FIG. 1 is an elevational view partially broken away and in cross section of a preferred embodiment of the instant invention.

A deaerator assembly constructed in accordance with the instant invention is generally shown at 10.

The assembly 10 includes a plurality of downwardly sloping cone-shaped dispersion members generally indicated as 12a, b, c, and d respectively. The dispersion members 12a–d are stacked on top of each other and in axially spaced relationship to each other. The upper dispersion members 12a –c are supported by support struts 13, the bottom dispersion member 12d being supported by legs 14.

The upper cones 12a–c include dividing means consisting of openings 16 therethrough for distributing a flow of liquid over the dispersion members 12a–d proportionately between each of the dispersion members 12a–d, as described below.

Figure 2:
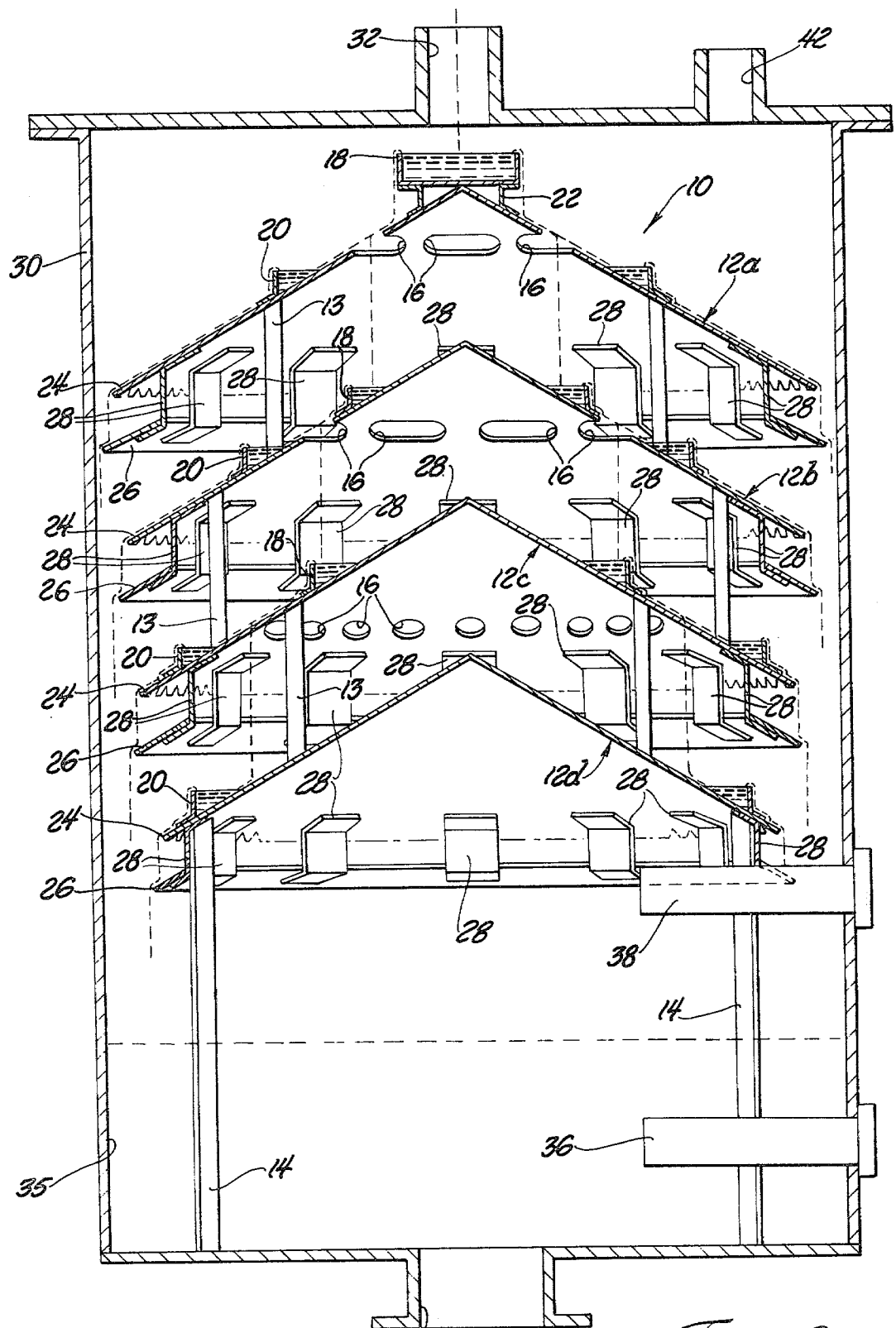
FIG. 2 is an elevational cross-sectional view of the preferred embodiment within a tank.

As best shown in FIG. 2, the upper dispersion members 12a–c include damming means consisting of annular walls or dams 18 and 20 extending upwardly from the upper surface of each dispersion member 12a–c. The first wall 18 is disposed above the respective openings 16 of each respective dispersion member 12a–c and the lower wall 20 is disposed below the respective openings 16. The first wall 18 extending upwardly from the top dispersion member 12a is in the form of a pan and includes an additional supporting structure 22. Alternatively, the wall 18 may be disposed directly on the cone 12a. The bottom cone 12d includes a single upwardly extending wall 20. The openings 16 in each of the upper dispersion members 12a–c are disposed radially inwardly of the circumference of the first upwardly extending dam or wall 18 of the next lower dispersion member 12b–d. That is, the openings 16 in member 12b are radially inwardly of the first dam or wall 18 in the next lower member 12c, and so on. The dams 18 dam the liquid flow so as to spread over the surface below each dam; the significance of the damming is discussed below.

The dispersion members 12a–d have serrated edges 24, as best shown in FIG. 1. The serrations significantly increase the surface length of the edges 24 in comparison to dispersion members having smooth edges.

Each of the dispersion members 12a–d include a conical flange 26 having a second edge portion spaced axially below its serrated edge 24 and extending outwardly radially beyond its serrated edge 24. A plurality support brace 28 extend downwardly from the bottom surface of each dispersion member 12a–d for supporting the flange 26. The FIGS. 1 and 2 do not show all of the braces 28 which would be disposed about the circumference of each of the dispersion members 12a–d. Each support brace 28 is disposed radially outwardly from the openings 16 in the associated dispersion members 12a–c.

The support struts 13 interconnecting the dispersion members 12a–c are disposed radially inwardly of the lower dam walls 20 of the lower one of each of the interconnected dispersion members 12b–d. The struts 13 can be positioned variously so long as the struts 13 do not interfere with the effectiveness of the flow through openings 16 over the dams 18 and 20.

As shown in FIG. 2, the dispersion members 12a–d can be disposed within a liquid tank 30. The liquid tank 30 of the preferred embodiment is a closed container and includes an inlet 32 for receiving the liquid into the tank 30 and an outlet 34 for allowing egress of the liquid. The inlet 32 is centrally disposed above the upper dispersion member 12a and the outlet 34 is disposed below the bottom dispersion member 12d. Alternatively, the inlet 32 can be disposed at other portions of the liquid tank 30. However, it would be necessary to provide a conduit means between the inlet and the inner circumference of the upper dam wall 18 of the upper cone to properly initiate the liquid flow.

The liquid tank 30 includes a liquid reservoir 35 disposed below the bottom dispersion member 12d. Within the reservoir 35 is a low level sensor 36 and a high level sensor 38. As shown in FIG. 1, the radially extending flange 26 from the bottom dispersion member 12d includes a notch 40 therein for allowing the high level sensor 38 to be disposed just beneath the serrated edge 24 thereof. The low level sensor 36 is disposed at a level above the outlet 34 for determining when the liquid level within the reservoir 35 is below a predetermined level. The high level sensor 38 is disposed below the bottom dispersion member 12d for determining when the liquid level within the reservoir 35 is above a predetermined level. Thusly, the rate of liquid input into the deaerating assembly 10 can be controlled.

As shown in FIG. 2, the liquid tank 30 includes a vacuum outlet 42 adapted to be connected to an appropriate positive displacement pump.

In operation, a viscous liquid designated by the dashed lines shown in FIG. 2, flows into the liquid tank 30 through the inlet 32 and over the dispersion members 12a–d. The assembly 10 is characterized by the dispersion members including the openings 16 for distributing the flow of liquid between each of the dispersion members 12a–d so that the liquid flow is divided into respective flows over the respective dispersion members 12a–d and over the edges 24 thereof. Thusly, the liquid flow is spread into a thin film to allow entrapped fluids within the liquid to escape from the liquid film. In other words, the openings 16 direct a proportionate amount of flowing liquid to each of the dispersion members 12a–d. The liquid not flowing through the openings 16 flows over the edges of the upper dispersion members 12a–c. The walls 18 and 20 dam the liquid flow so that the liquid overflowing the walls is spread to completely cover the upper surface of the dispersion member below each of the dams 18 and 20. Thusly, the dam walls 18 and 20 redistribute the liquid flowing over the upper surface of each dispersion member 12a to cover the entire surface below the dam wall thereby thinning the liquid flow. The film further thins out as it falls over the serrated edges 24 due to gravitational acceleration. The scalloped edges provide a greater edge length, therefore, significantly increasing the edge-breaking effect. The edges of the flanges 26 provide a second edge over which the liquid falls, again multiplying the edge effect. The result is that the flowing liquid is spread into an extremely thin film causing the fluid bubbles entrapped therein to expand and break and escape from the liquid chamber 30 by the applied vacuum through the opening 42.

The size of the openings 16 vary between the upper dispersion members 12a–c to substantially evenly divide the liquid flow among the dispersion members 12a–d so that the respective flows over the edges 24 of the respective dispersion members 12a–d are substantially equal. Thusly, the capacity of the instant invention is significantly made greater than the prior art in that the original flow is divided proportionately to flow in parallel flows over multiple dispersion members 12a–d rather than in series or a single flow over a single member. Accordingly, each dispersion member is efficiently utilized by receiving a proportionate share of the flow.

Therefore, in accordance with the instant invention, liquid flowing through inlet 32 is puddled within the dam 18. Liquid overflowing the wall 18 of the dam flows over the upper surface of upper cone 12a. The openings 16 in dispersion member 12a allow three-quarters of the flow through the openings 16 and one-quarter of the flow to spread over the lower portion of the dispersion member 12a. Dam 20 of dispersion member 12a puddles the remaining flow thereby redistributing it circumferentially around the dam 20. Thusly, the overflowing liquid is spread into a film completely about the outer surface of the dispersion member 12a. As the liquid falls over the serrated edges 24 and over the flange portion 26, it is further spread into a very fine film. As previously described, the bubbles of fluid trapped within the liquid are stretched and eventually burst. The released fluid escapes through the applied vacuum.

The flow falling from the openings 16 in the uppermost dispersion member 12a is puddled by dam 18 of dispersion member 12b thereby completely spreading out the overflowing liquid therefrom. Openings 16 in dispersion member 12b are constructed so that two-thirds of the flow (one-half of the original flow) falls to the next lower dispersion member 12c and one-third of the flow (one-quarter of the original flow) remains to be puddled by dam member 20 of dispersion member 12b. The puddled liquid then follows the same course as described above for dispersion member 12a.

The liquid falling to dispersion member 12c is puddled by dam 18 thereof. Openings 16 in dispersion member 12c allow one-half of the flow (one-quarter of the original flow) to fall to the bottom dispersion member 12d. Therefore, in accordance with the above-described invention, approximately one-quarter of the original flow is distributed to each of the dispersion members 12a–d. Thusly, the instant invention permits a much higher volume of fluid to be processed per unit of time as compared to conventional cone deaerators. The instant invention also tolerates some particulate matter which can plug the orifices of other types of prior art deaerators.

The invention requires a continuous relatively high vacuum with a metered inflow to provide optimum deaeration. In order to meter the flow, the level sensors 36 and 38 indicate when the level of the viscous liquid within the reservoir 35 is above or below predetermined levels within the reservoir. A feedback loop can be constructed between the sensors 36 and 38 and the liquid input such that the rate of liquid input is controlled.

The instant invention can be used to remove gases or moisture from a viscous liquid.

The instant invention also provides a method of deaerating a flow of liquid. First, the liquid is spread over the plurality of downwardly sloping cone-shaped dispersion members 12a–d, each one being stacked on top of each other and in spaced relationship to each other. Next, the flow is divided through openings 16 extending through the dispersion members 12a–c into respective flows over the respective dispersion members 12a–d and over the respective edges 24 thereof whereby the liquid flow is spread into a thin film, thereby allowing the entrapped fluid within the liquid to escape from the liquid film.

The method further includes damming the liquid flow over the upper surface of the dispersion members 12a–c by the cylindrical walls or dams 18 and 20 extending upwardly therefrom and spaced from the edges 24 thereof and overflowing the liquid over the walls 18 and 20 to completely spread the flow of liquid over the upper surface of the dispersion members 12a–d below the walls 18 and 20. The method further includes disposing the dispersion members 12a–d within the liquid tank 30 and applying a vacuum to the liquid tank 30. Finally, the method includes the step of sensing when the level of the liquid within the liquid tank 30 is below a predetermined level by a low level sensor 36 and sensing the level of the liquid above a predetermined level by a high level sensor 38, thusly controlling the rate of flow into the liquid tank 30 and maximizing the effectiveness of the subject deaerator assembly.

The invention has been described in an illustrative manner and it is to be understood that the terminology which has been used is intended to be in the nature of words of description rather than of limitation. Obviously, many modifications and variations of the present invention are possible in light of the above teachings. It is, therefore, to be understood that within the scope of the appended claims wherein reference numerals are not to be in any way limiting, the invention may be practiced otherwise than as specifically described.

The embodiments of the invention in which an exclusive property or privilege is claimed are defined as follows:

1. A deaerator assembly (10) comprising; a plurality of downwardly sloping cone-shaped dispersion members (12a–d) stacked on top of each other and in spaced relationship to each other, each of said dispersion members (12a–d) having a circumferential edge (24) extending beyond the edge of the next lower dispersion member (12a–d) and dividing means (16) for distributing a flow of liquid between each of said dispersion members (12a–d) so that the liquid flow is divided in respective flows over said respective dispersion members (12a–d) and over said respective edges (24) whereby the liquid flow is spread into a thin film allowing entrapped fluids within the liquid to escape from the liquid film, and characterized by said dispersion members (12a–d) including damming means (18, 20) disposed about the upper surface thereof and spaced from the edge (24) thereof for damming the flow of liquid whereby the overflowing liquid is spread to completely cover the upper surface of said dispersion members (12a–d) below said damming means (18, 20).

2. An assembly as set forth in claim 1 wherein said dispersion members (12a–d) include damming means (18, 20) disposed about the upper surface thereof and spaced from the edge (24) thereof for damming the flow of liquid whereby the overflowing liquid is spread to completely cover the upper surface of said dispersion members (12a–d) below said damming means (18, 20).

3. An assembly as set forth in claim 2 wherein each of said upper dispersion members (12a–c) includes a first damming means (18) disposed above said openings (16) therein and a second damming means (20) disposed below said openings (16) therein.

4. An assembly as set forth in claim 3 wherein each of said damming means (18, 20) comprises an annular wall (18, 20) extending upwardly from the upper surface of said dispersion members (12a–d).

5. An assembly as set forth in claim 4 wherein said openings (16) in each of said upper dispersion members (12a–c) are disposed radially inwardly of the circumference of said first damming means (18) of the next lower dispersion members (12b–d).

6. An assembly as set forth in claim 5 wherein the size of said openings (16) of said upper dispersion members (12a–c) vary to substantially evenly divide the flow among said dispersion members (12a–d) so that the respective flow over said edges (24) of said repsective dispersion members (12a–d) are substantially equal.

7. An assembly as set forth in claim 6 wherein said edges (24) of said dispersion members (12a–d) are serrated to increase the edge surface length of said edge (24).

8. An assembly as set forth in claim 7 wherein each of said dispersion members (12a–d) includes a conical flange (26) having a second edge portion spaced axially below said serrated edge (24) and extending outwardly radially beyond said serrated edge (24).

9. An assembly as set forth in claim 8 wherein each of said dispersion members (12a–d) includes a plurality of support braces extending downwardly from the bottom surface thereof for supporting said flange (26), said support braces (28) being disposed radially outwardly of the openings (16) in the associated dispersion members (12a–c).

10. An assembly as set forth in claim 9 including support struts (13) interconnecting said dispersion members (12a–c) and being disposed radially inwardly of said second dam means (20) of the lower one of said interconnected dispersion members (12b–d).

11. An assembly as set forth in claim 10 including support legs (14) extending downwardly from the bottom surface of said bottom dispersion member (12d) and disposed radially inwardly from said downwardly extending support braces (28).

12. An assembly as set forth in claim 11 wherein said dispersion members (12a–d) are disposed within a liquid tank (30).

13. An assembly as set forth in claim 12 wherein said liquid tank (30) is a closed container and includes an inlet (32) for receiving the liquid into the tank (30) and an outlet (34) for allowing the liquid to flow out from the tank (30).

14. An assembly as set forth in claim 13 wherein said inlet (32) is centrally disposed above said dispersion members (12a–d) and said outlet (34) is disposed below said dispersion members (12a–d).

15. An assembly as set forth in claim 13 wherein said liquid tank (30) includes a liquid reservoir (35) disposed below said bottom dispersion member (12d).

16. An assembly as set forth in claim 15 wherein said liquid tank includes a low level sensor (36) disposed above said outlet (34) for determining when the liquid level within said reservoir (35) is below a predetermined level and a high level sensor (38) disposed below said bottom dispersion member (12d) for determining when the liquid level within said reservoir is above a predetermined level.

17. An assembly as set forth in claim 15 wherein said liquid tank (30) includes a vacuum outlet (42) adapted to be connected to a vacuum pump.

18. A dispersion member (12) for use in a deaerator assembly (10) comprising; a downwardly sloping conical shaped member (12) including at least one opening (16) therethrough and at least one cylindrical dam (18) on the upper surface thereof disposed above said opening (16) and at least one cylindrical dam (20) on the upper surface thereof disposed below said opening (16) for damming the flow of liquid thereover whereby the overflowing liquid is spread to completely cover the upper surface of said dispersion member (12) below each of said cylindrical dams (18, 20).

19. A method of deaerating a flow of liquid including the steps of; spreading the liquid over a plurality of downwardly sloping cone-shaped dispersion members (12a-d) stacked on top of each other and in spaced relationship to each other, dividing the flow of liquid through openings (16) extending through the dispersion members (12a-c) into respective flows over the respective dispersion members (12a-c) and over the respective edges (24) thereof whereby the liquid flow is spread into a thin film, allowing the entrapped fluids within the liquid to escape from the liquid film, and characterized by damming the liquid flow over the upper surface of the dispersion members (12a-d) by cylindrical walls (18, 20) extending upwardly therefrom and spaced from the edges (24) thereof and overflowing the liquid over the walls (18, 20) to completely spread the flow of liquid over the upper surface of the dispersion members (12a-d) below the walls (18, 20).

20. The method as set forth in claim 19 further defined as disposing the dispersion members (12a-d) within a liquid tank (30).

21. The method as set forth in claim 20 including applying a vacuum to the liquid tank (30).

22. A method as set forth in claim 20 further including the step of sensing the level of liquid within the liquid tank (30) below a predetermined level by a low level sensor (36) and sensing the level of liquid above a predetermined level by a high level sensor (38).

* * * * *